United States Patent Office 3,516,104
Patented June 23, 1970

3,516,104
WASHING AND DRYING APPARATUS
Howard H. Hobbs and Calvin S. Kunkle, Tipton, Ind.,
and Acial L. Cataline, Canton, Ga., assignors to
Bramco Inc., Canton, Ga., a corporation of Georgia
Filed Oct. 10, 1966, Ser. No. 585,657
Int. Cl. A01h 43/00; A23n 13/00
U.S. Cl. 15—3.13
6 Claims

ABSTRACT OF THE DISCLOSURE

An egg inspection, washing and drying machine including a cross loader for arranging the eggs in transversely spaced rows, a washing and drying assembly, a helix conveyor for passing the eggs in single file through the washing and drying assembly with the major axis of each egg angularly oriented to the path of travel of the eggs whole rotating the egg about its major axis, and a transfer mechanism to transfer the eggs from the cross loader to the helix conveyor in single file.

---

This invention relates to an inspection, washing, and drying apparatus and is more particularly concerned with a method and apparatus in which eggs or other ellipsoidal objects are inspected and then automatically washed, dried, and thereafter deposited in a collection zone. The invention is also concerned with the sub-combination of the machine; namely, the conveyor mechanism of the machine, the inspection mechanism, the weshing mechanism and the drying mechanism.

In the past, machines have been developed for automatically washing eggs; however, these machines utilize substantial amounts of detergents and water and do not adequately wash the eggs. The machines also occupy a great deal of space, are quite complicated, and are difficult to repair. Furthermore, in many instances, the eggs passing through the machine are broken, due to the rough handling of the eggs.

Briefly described, the machine of the present invention, which seeks to overcome the difficulties described above, includes a quite compact apparatus in which the eggs are conveyed on a plurality of juxtaposed spinning spool bars which are disposed for rotation on transverse axes and are removed successively across a cross loader. At an intermediate portion in the cross loader, the spool bars are spun at relatively higher speeds so as to rotate the eggs as they are inspected. Thereafter, the eggs are discharged in transverse rows from the conveyor and lowered gently by means of a delivery paddle assembly to a transfer conveyor. Successive eggs are then discharged from the transfer conveyor to a transfer rack and thence onto a pair of spiral rods of a helix conveyor, which cooperates with each other, to move the eggs successively along a washing and drying path. These spiral or helical rods are so disposed and operated with respect to each other as to orient and maintain the eggs with their major axes at an acute angle to the path of travel as the eggs are rotated about their major axes and moved along their path of travel. In the path of travel, the eggs are first subjected to washing brushes and a stream of water and detergent in a washing zone. Thereafter, the eggs may, if desired, pass beneath rinsing water and brushes in a rinsing zone and, thence, to the drying brushes and hot air in a drying zone. At the end of the helical conveyor the eggs are successively discharged onto a collection table in a collection zone.

The brushes, which wash, rinse and dry the eggs, are rotated about axes disposed parallel to the path of travel of the eggs and hot air is introduced through the drying brushes during the drying operation.

An important feature of the invention is the principle of carrying the eggs through the washing and drying cycles by means of two spiral or helical rods. These rods are so timed that the major axes of each egg is disposed at approximately 40 degrees from the brush action angle so that a considerable portion of the egg is subjected to scrubbing action from brushes on both sides of the path of travel of the egg, one brush scrubbing in one direction and the other scrubbing in the other direction and the egg is rotated about its major axis quite rapidly.

Each egg, therefore, is quite thoroughly washed and is in a quite sterile condition upon being discharged to the collection table. Since the washer-dryer assembly of the machine is relatively short and the cross loader is disposed at approximately a right angle to the conveyor for the washer-dryer assembly, the machine of the present invention occupies little floor space.

Accordingly, it is an object of the present invention to provide an inspection, washing, and drying machine which is inexpensive to manufacture, durable in structure, and efficient in operation.

Another object of the present invention is to provide an egg inspection, washing and drying machine which will automatically permit the high speed inspection, washing, and drying of eggs.

Another object of the present invention is to provide an egg inspection, washing and drying machine which will gently handle the eggs, thereby minimizing breakage of the eggs.

Another object of the present invention is to provide a machine for washing eggs which will generally subject the eggs to rapid inspection and thorough washing and scrubbing.

Another object of the present invention is to provide an efficient means for drying eggs which have been washed.

Another object of the present invention is to provide an egg inspection, washing and drying machine which may be readily and easily cleaned and repaired.

Another object of the present invention is to provide an egg inspection, washing and drying machine which occupies little floor space.

Another object of the present invention is to provide an egg inspection, washing, and drying machine which can be operated by one person.

Another object of the present invention is to provide an egg inspection, washing and drying machine which utiizes little electrical power to provide a relatively fast delivery of eggs through the machine.

Another object of the present invention is to provide an egg inspection machine which will quickly display, spin and candle a large volume of eggs.

Another object of the present invention is to provide a novel means for conveying eggs.

Other objects, features and advantages of the present invention will become apparent from the following description when taken in conjunction with the accompanying drawings wherein like characters of reference designate corresponding parts throughout the several views and wherein:

While the present invention is peculiarly suited for the inspection, washing, and drying of eggs and the preferred embodiment, hereinafter described, discloses the operation of the machine with respect to eggs, it will be apparent that other relatively round or ellipsoidal small objects, such as peaches, pears, apples, oranges, tomatoes, golf balls, baseballs, potatoes, and the like could be inspected, washed and dried employing the same inventive concept as herein disclosed.

Figures 1, 2:
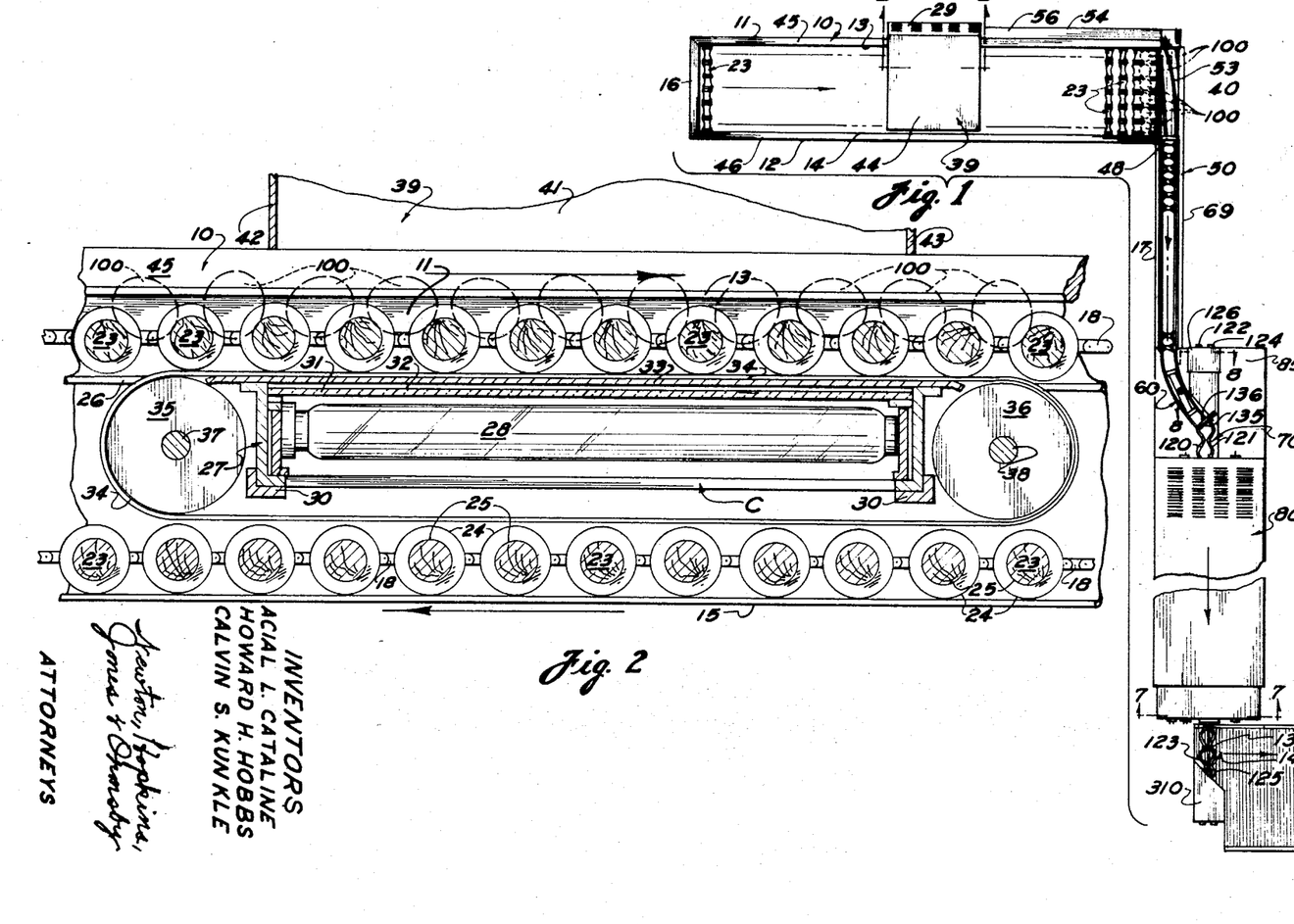
FIG. 1 is a partially broken plan view of an egg inspection, washing, and drying machine constructed in accordance with the present invention.
FIG. 2 is an enlarged fragmentary vertical sectional view taken substantially along line 2—2 in FIG. 1.

Referring now in detail to the embodiment chosen for the purpose of illustrating the present invention, it being understood that the present invention is not limited to the exact details depicted in such drawings, the major components of the machine, as best seen in FIG. 1, include a cross loader 10 across which the eggs 100, in transverse and longitudinal rows, are conveyed from the one end to the other. During the travel, a spin is imparted to the eggs 100 to orient them on transverse axes and, at an intermediate portion in the path of travel of the eggs 100, successive transverse rows of the eggs 100 are rotated at a higher speed about their axes, as they pass across lights for the purpoe of visually inspecting or candling the eggs 100.

At the discharge end of the cross loader 10 is a delivery paddle assembly, denoted generally by numeral 40, the delivery paddle assembly 40 cooperating with the cross loader 10 to rotate the eggs 100 and deliver successive transverse rows of the eggs 100 to a right angularly disposed transfer conveyor 50.

Thence, the eggs 100, in evenly spaced single file fashion, are delivered by the transfer conveyor 50 to a transfer rack 60 which in turn, delivers the eggs 100 successively onto an opposed helix conveyor 70. The arrangement of the transfer rack 60 and the helical conveyor 70 are such as to orient the major axis of each egg 100 at approximately a 50 degree angle to their path of travel and maintain it so disposed as the same passes through the washer-dryer assembly 80. In the washer-dryer assembly 80, the eggs 100 are first washed in a detergent and water and then are rinsed, if desired, and thereafter are rapidly dried. Next, the helix conveyor 70 deposits the eggs 100 onto a collection table 90.

The drive of the various mechanisms described above is synchronized so that the speed of delivery of the eggs 100 may be varied, as desired.

CROSS LOADER

The cross loader 10 includes a rectangular horizontally disposed frame having a pair of spaced, parallel, vertically disposed, longitudinally extending, side plates 11 and 12. The upper edges of the side plates 11 and 12 are turned inwardly to provide top flanges 13 and 14, respectively. In like manner, the bottom edges of the side plates 11 and 12 are turned inwardly to provide lower flanges or bottom flanges, such as flange 15 in FIG. 2. The entrance end of the side plates 11 and 12 are joined by an entrance end plate 16 while the exit end of the side plates 11 and 12 are joined by an exit end plate 17, seen best in FIG. 6. Legs (not shown) support the frame in a horizontal position at an appropriate height for access by an operator.

Figure 3:
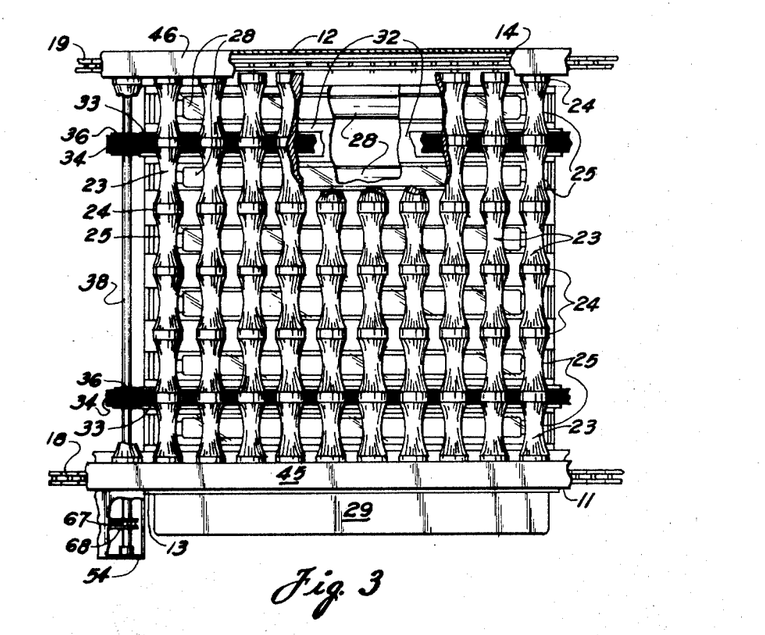
FIG. 3 is an enlarged, partially broken away, plan view of that portion of the cross loader shown in FIG. 2.
Figures 6, 7, 8:
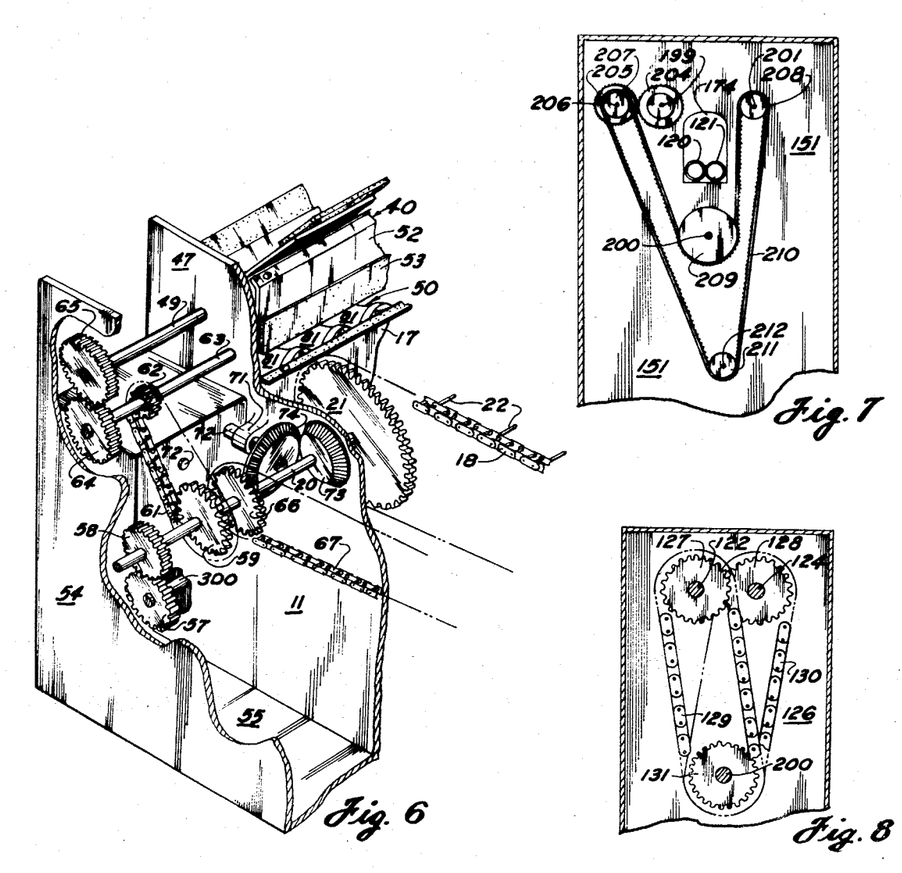
FIG. 6 is an enlarged fragmentary perspective view of the corner portion of the machine illustrated in FIG. 1 and showing the drive mechanism between the cross loader, the spin belts, the paddle assembly, and the transfer conveyor.
FIG. 7 is a vertical sectional view taken substantially along line 7—7 in FIG. 1.
FIG. 8 is an enlarged vertical sectional view taken substantially along line 8—8 in FIG. 1.

Within the frame of the cross loader 10 and respectively adjacent the side plates 11 and 12, so as to be concealed by the flanges, such as flanges 13, 14, and 15, are a pair of opposed, complementary, continuous conveyor chains 18 and 19, the upper flights of which are disposed in a common horizontal plane. Opposed parallel, transversely extending sprocket shafts, such as shaft 20 in FIG. 6, are disposed respectively inwardly adjacent the end plates 16 and 17 and in the same horizontal plane. Sprockets, such as sprocket 21, are carried by these shafts and, in turn, carry the chains 18 and 19 so that the upper flight of the chain 18 moves beneath flange 13 and the upper flight of chain 19 moves beneath flange 14, as illustrated in FIG. 3. The arrows in FIGS. 1, 2 and 3 indicate the direction of travel of the flights of the chains 18 and 19.

Evenly spaced opposed pairs of stub shafts 22 project inwardly from the conveyor chains 18 and 19 and each pair of stub shafts 22 receives therebetween, for rotation, a spool bar 23. Each spool bar 23 has a plurality of evenly spaced, large, equal diameter, portions 24 which taper toward each other to define equal diameter portions 25 therebetween. Thus, in cross-section, the contour of a surface between adjacent large diameter portions 24 is concave.

The transversely disposed spool bars 23 are spaced from each other and are so contoured that eggs 100 are supported by longitudinal adjacent pairs of narrow diameter portions 25 of successive spool bars 23. Therefore, the eggs 100, when conveyed by the cross loader 10, are disposed in transverse and longitudinal rows, each pair of spool bars 23 in the top flight supporting a transverse row of the eggs 100.

The sprockets 21 drive the top flight of the spool bars 23, carrying eggs 100, across the cross loader 10, from the entrance end to the exit end thereof. Disposed immediately below the sides of the upper flight of the spool bars 23 are a pair of opposed, inwardly projecting, longitudinally extending, spool supports 26, seen in FIG. 3. Supports 26 are respectively carried by and project inwardly from side plates 11 and 12. The lower periphery of large diameter portions 24 contact the spool supports 26, as the spool bars 23 are moved across the cross loader 10, and, therefore, each spool bar 23 is rotated about its axis so as to orient the egg 100 with the major axis of each egg 100 extending transversely of the cross loader 10.

At an intermediate portion in a path of travel of the eggs 100 on cross loader 10 and disposed beneath the upper flight of the spool bars 23, is a candler assembly, denoted generally by the letter C, the purpose of which is to shine light up through the eggs 100 so that the operator may detect those eggs 100 which are not in a fresh condition, or otherwise not suitable for human consumption.

The candler assembly C includes a relatively small rectangular frame 27 which carries a plurality of fluorescent lights 28. At one end of the frame 27 is a ballast transformer housing 29 which houses the appropriate transformers (not shown) and starting coils (not shown) for the fluorescent lights 28.

Carried between the side plates 11 and 12, in the central portion of the cross loader 10, are a pair of spaced, parallel, transversely extending, angle bars 30 which are adapted to receive slideably the candler frame 27. Openings are provided in the side plates 11 and 12 so that the candler frame 27 may be inserted from either side of the cross loader 10 into the interior of the cross loader frame to the extent that the transformer housing 29 (which is larger than frame 27) abuts the side plate 11 or 12, through which the candler frame 27 has been inserted, as the case may be. The openings and the angle bars 30 are so arranged as to dispose removably the fluorescent lights 28 beneath the upper flight of the spool bars 23.

Above the fluorescent lights 28 and carried by the candler frame 27 is a sheet of glass 31 having transversely spaced strips of opaque paint 32 so that clear glass is disposed immediately above each fluorescent light 28 and stray beams of light therefrom are blocked out by the opaque paint 32. These stray beams of light tend to make candling somewhat more difficult for the operator. Thus, light shines upwardly through the adjacent spool bars 23 as the spool bars 23 move over the top of the candler assembly C thereby illuminating the eggs 100 for purposes of inspection.

For imparting a greater spin to the eggs 100, the upper surface of the candler frame 27 is provided with a pair of longitudinally extending tracks 33 which receive the top flights of flat spinning belts 34. Spinning belts 34, respectively, pass around opposed pairs of pulleys 35 and 36, outwardly of and adjacent the candler frame 27. Pulleys 35 are disposed in spaced relationship on a common shaft 37. In like manner, pulleys 36 are disposed in spaced relationship on a common shaft 38. The shafts 37 and 38 are disposed in a common horizontal plane and are journaled by the sides 11 and 12, outwardly adjacent the angle bars 30.

When spool bars 23 reach the belts 34, the contour of the tracks causes the spool bar 23 to be lifted off of the spool supports 26 and the speed of travel of belts 34 impart a rapid spin to the spool bars 23, thereby causing the eggs 100 thereon to be spun rapidly above lights 28.

For the purpose of darkening the candling zone of the cross conveyor 10, a hood, denoted generally by numeral 39, is provided over the central portion of the cross conveyor 10. This hood 39 includes a back 41 and a pair of opposed sides 42 and 43, as well as a top 44. The back 41 is longer than the sides 42 and 43 and is mounted to either side plate 11 or side plate 12. In the embodiment chosen for illustration, the back 41 is illustrated as being mounted on side plate 11 and projects thereabove so that the top 44 and sides 42 and 43 are disposed over the conveyor of the cross loader 10, vertically above the frame 27. The lower edges of the sides 42 and 43 are of sufficient height to permit the eggs 100 carried on the spool bars 23 to pass therebeneath. The side opposite the back 41 is open so that an operator may view the eggs 100 as the spool bars 23 move them beneath the hood 39. Preferably, the interior of the hood 39 is black so as to prevent reflection of light from fluorescent lights 28.

To maintain the eggs on the cross conveyor, i.e., on the spool bars 23, a pair of longitudinally extending inwardly and downwardly inclined rails 45 and 46 are disposed respectively on the flanges 13 and 14.

PADDLE ASSEMBLY

The paddle assembly 40 is a mechanism by which the eggs, being discharged from the exit end of the cross loader, are lowered gently onto the transfer conveyor 50 and at the same time the major axes of the eggs 100 are rotated 90 degrees so as to be transversely disposed on the transfer conveyor 50.

Projecting beyond and aligned with and integrally connected to the side plates 11 and 12 are a pair of upstanding flanges 47 and 48, which journal a horizontal paddle drive shaft 49. Between the flanges 47 and 48, the drive shaft 49 carries a sectagonal paddle block 51. On alternate flat faces of the paddle block 51 are, respectively, a plurality of paddle plates 52 which project angularly outwardly thereof. The free end of each paddle plate 52 is curved longitudinally thereof and is provided with a rectangular rubber paddle blade 53.

Figure 5:
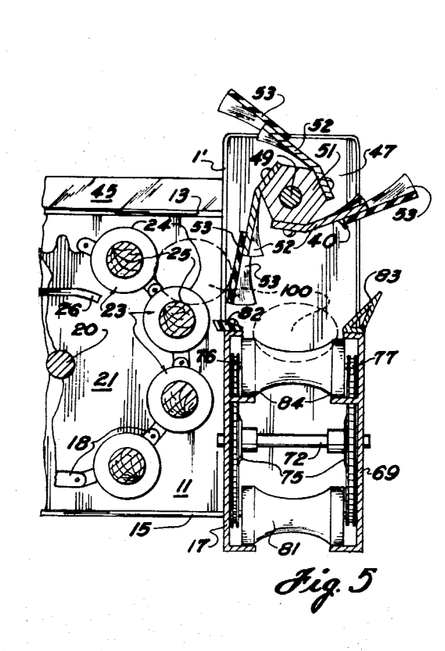
FIG. 5 is an enlarged vertical sectional view taken substantially along line 5—5 in FIG. 1.

Shaft 49 rotates the paddle assembly in a counterclockwise direction as viewed in FIG. 5 so that the rotation is opposite the rotation of the shaft 20. As seen in FIG. 6, the shaft 49 and the shaft 20 project outwardly of the flange 47 and the side plate 11 and are journaled by the outer plate 54 of a gear housing which extends along the side of the cross loader 10. Plate 54 is supported by a bottom plate 55 and a top plate 56 appropriately secured to the side plate 11. Within the gear housing, thus created, are a number of gears seen in FIG. 6 for synchronizing the drive of the various parts heretofore described. In more detail, power from a source of power is supplied, via a power transfer shaft 300, which drives a gear 57, the gear 57 meshing with a gear 58 on shaft 20.

Figure 15:
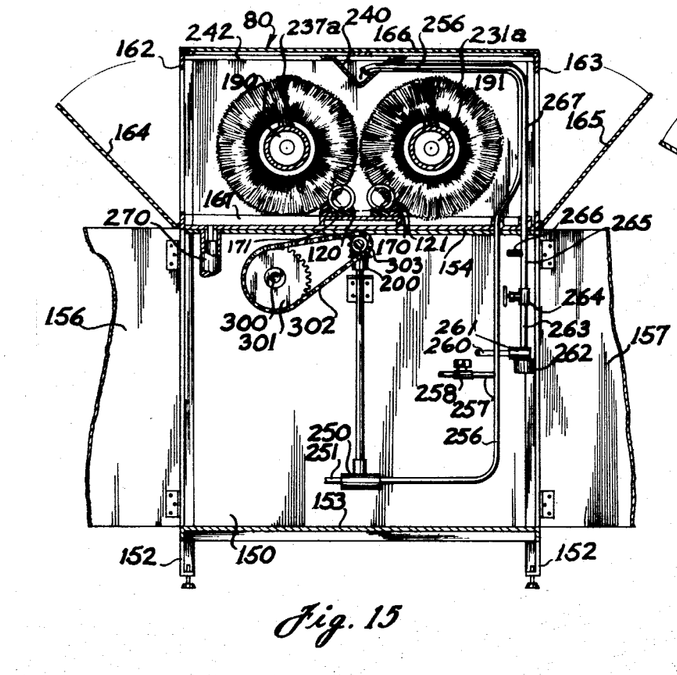
FIG. 15 is a vertical sectional view taken substantially along line 15—15 in FIG. 12.

Power transfer shaft 300 is a horizontally disposed shaft which extends beneath the transfer conveyor 50 and the washer-dryer assembly 80 and has universal joints (not shown). As illustrated in FIG. 15, shaft 300 is provided with a sprocket 301 which is driven by a chain 302 from a sprocket 300 on shaft 200.

Inwardly of the gear 58, shaft 20 is provided with a sprocket 59 which drives a continuous chain 61. The chain 61 passes around a smaller sprocket 62 on a power transfer shaft 63, the power transfer shaft 63 being journaled between outer plate 54 and flange 47. On the power transfer shaft 63 is a gear 64 which meshes with and drives a gear 65 on shaft 49. Thus, upon rotation of shaft 20 in a counterclockwise direction as indicated in FIG. 6, the shaft 49 will be driven at a synchronized but lower speed and in the opposite direction.

Inwardly of the sprocket 59 is a second sprocket 66 on shaft 20. This sprocket 66 drives a continuous chain 67 which, in turn, drives a sprocket 68 on shaft 38. Therefore, the drive for the spinning belts 34 is synchronized with the drive of the chains 18 and 19.

Referring back to the paddles 53, these paddles are disposed essentially helically, as best seen in FIG. 1. Furthermore, as seen in FIG. 5, the paddle assembly 40 is so disposed with respect to the discharge end of the upper flight of the spool bars 23 as to receive thereagainst a transverse row of eggs 100, as the spool bars 23 pass around the upper portion of the sprockets 21. By such an arrangement, the egg closest to the side plate 11 travels further in engaging a paddle 53 than does the egg adjacent the side plate 12 for purposes to be described hereinafter.

TRANSFER CONVEYOR

The transfer conveyor 50 is disposed perpendicular to the cross feed conveyor 10. The eggs 100 received from the cross loader 10 are fed in single file fashion along the transfer conveyor 50.

In more detail, the frame of the transfer conveyor 50 includes the end plate 17 which projects outwardly of the side plate 12. Spaced in parallel relationship to the end plate 17 is a second plate 69, one end of which is carried by the outer plate 54.

Figure 4:
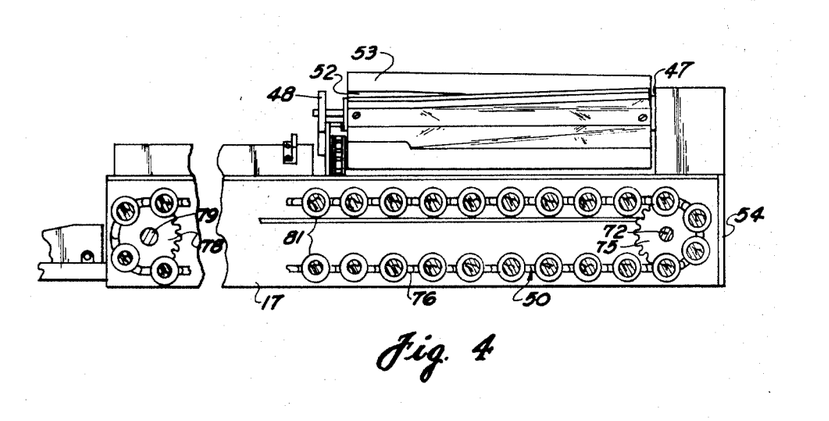
FIG. 4 is an enlarged vertical sectional view taken substantially along line 4—4 in FIG. 1.

Journaled by the second plate 69 and a pillar block 71, seen in FIG. 6, is a sprocket shaft 72 which, through a pair of beveled gears 73 and 74 and other gears (not shown), is driven from shaft 20. A pair of sprockets 75 are disposed on shaft 72, inwardly adjacent the plates 17 and 69, respectively. Around these sprockets 75 are a pair of opposed complementary continuous chains 76 and 77, the chains passing also around spaced sprockets 78 on a sprocket shaft 79, as seen in FIG. 4.

Shafts 72 and 79 are disposed in a common horizontal plane with shaft 72 being adjacent the entrance end of the transfer conveyor and shaft 79 being disposed adjacent the exit end thereof. Shaft 79 is also carried between the plates 17 and 69.

Rotatably carried between the chains 76 and 77, in succession, are a plurality of spools 81, each spool 81 having a narrowed central portion and a larger outer diameter portion. The contour of the spools 81 is similar to the contour of individual portions of the spool bars 23 and, therefore, adjacent spools 81 on the top flight of the spools are adapted to receive an egg 100. The top flight of spools 81 is below the top of flight of spool bars 23 so as to receive the eggs 100 therefrom.

It will be remembered that the drive of shaft 72 is synchronized with the drive of shaft 20; however, shaft 72 moves the top flight of the spools 81 at a substantially increased speed of approximately six times the speed of travel of the spool bars 23. Therefore, as a transverse row of, for example, six eggs 100 is discharged from the spool bars 23, a group of spools 81, sufficient to receive these eggs 100 thereon, are disposed approximately adjacent the discharge end of the cross loader 10.

As explained above, a paddle 53 is interposed between the spools 81 and a spool 23 as a transfer of a row of eggs 100 takes place. Therefore, upon continued rotation of the shaft 49, this paddle 53 will gradually lower the eggs 100 into the spaces between adjacent spools 81. Since each paddle 53 is disposed in helical fashion, with the portion of paddle 53 adjacent the plate 11 being advanced, in its direction of rotation, with respect to the portion of the paddle adjacent the plate 12, the egg 100, adjacent the plate 11 in the row being transferred will be lowered first and succeeding eggs 100 therein will be successively deposited in space between the spools 81, forwardly of the first deposited egg 100. After the first three eggs of a particular row from the cross loader 10 are deposited on the transfer conveyor 50, they will urge the successive three eggs into their appropriate spaces.

An important feature of the paddle assembly 40 operating in conjunction with the cross loader 10 and the transfer conveyor 50 is that the eggs 100 are arranged so that their axes are in alignment transversely of the cross loader 10, as they approach this transfer zone; however, because of the arrangement of the paddles 53 and their helical disposition, the axes of the respective eggs 100 will be rotated approximately 90 degrees, whereby the eggs 100, as received in the conveyor 50 between the spools 81, have their axes parallel to each other and transversely of the conveyor 50.

On the upper edge of the end plate 17, in the transfer zone between the cross loader 10 and the transfer conveyor 50 is a resilient rubber or plastic bumper 82 which is adhered by means of adhesive or the like to the upper edge flange of plate 17, as illustrated in FIGS. 5 and 6. The purpose of this bumper 82, which is essentially trapezoidal in cross section, is to prevent the eggs 100 from being cracked if they engage the upper edge of the end plate 17. To prevent the eggs 100 from rolling out of the upper flight of the spools 81, a downwardly and inwardly inclined deflector plate 83 is provided along the upper edge of the plate 69.

Below the upper flight of the spools 81 are a pair of opposed inwardly projecting supports 84 which are carried by the plates 17 and 69, respectively. The function of supports 84 is to impart a rolling action to each spool 81 in its upper flight, and to thereby rotate each successive egg 100 on the transfer conveyor 50 and hence assure the proper orientation of the axis of that egg transversely of the path of travel.

TRANSFER RACK

As the eggs successively reach the discharge end of the transfer conveyor 50, they are successively fed onto a transfer rack 60. The purpose of the transfer rack is to arrange the eggs 100 in spaced relationship, pass them through an arc of approximately 40 degrees, and feed them onto successive convolutions of the helix conveyor 70. This is accomplished by a walking action in which the eggs 100 roll down an incline, then are lifted and rolled down a second incline, etc.

Figure 9:
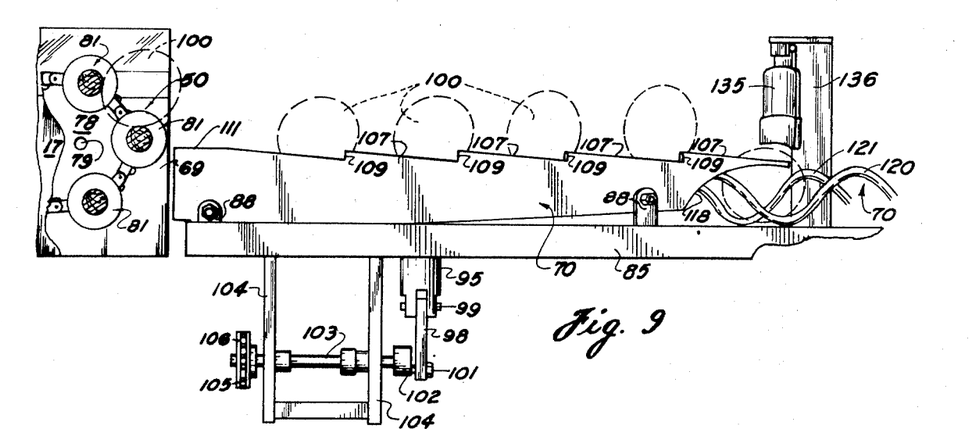
FIG. 9 is an enlarged side elevational view of the transfer rack of the machine shown in FIG. 1.
Figure 10:
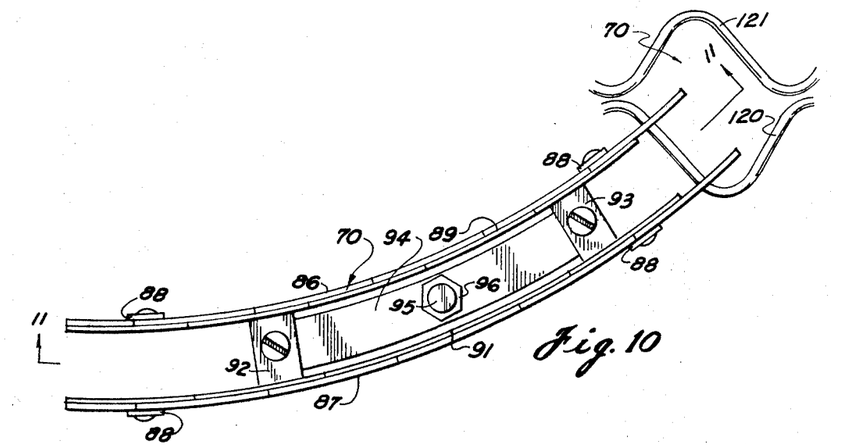
FIG. 10 is an enlarged plan view of the transfer rack shown in FIG. 9.
Figure 11:
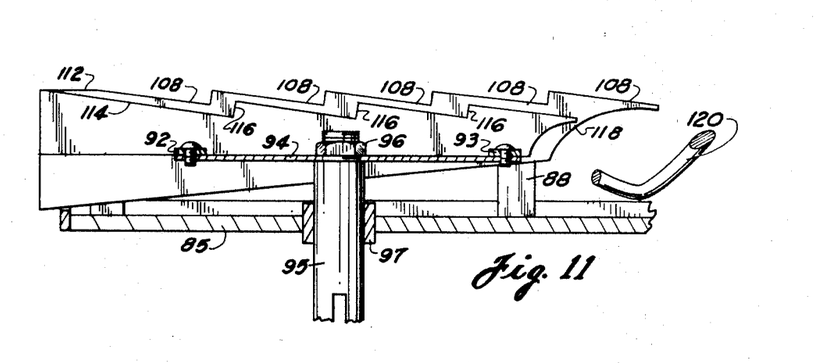
FIG. 11 is an enlarged fragmentary vertical sectional view taken substantially along line 11—11 in FIG. 10.

In more detail, the transfer rack 60, best seen in FIGS. 9, 10, and 11, is disposed with its entrance end at the discharge end of the transfer conveyor 50, the rack 60 being supported by an appropriate horizontally disposed platform 85. The rack 60 includes a pair of opposed arcuate, outer rails 86 and 87 which are disposed vertically and are carried by brackets 88 secured to the upper surface of platform 85. Within the outer rails 86 and 87 are a pair of opposed, arcuate, vertically disposed, inner rails 89 and 91 which are reciprocated in a vertical path. The lower edge of the inner rails 89 and 91 is carried by a pair of spaced cross straps 92 and 93 which are secured respectively to the ends of a flat arcuate reciprocator plate 94. The central portion of the reciprocator plate 94 is provided with a hole through which the threaded, reduced diameter end of a reciprocator shaft 95 projects. A nut 96 retains the reciprocator plate 94 in place.

Shaft 95 is slidably carried by a bushing 97 in the platform 85. The lower end of shaft 95 projects below the platform 85 and is bifurcated for receiving the end portion of a connecting rod 98. A pin 99, passing through the end portion of the shaft 95, and the connecting rod 98, pivotally secure the shaft 95 and rod 98 together. The lower end of the connecting rod 98 is pivotally received by an eccentrically projecting pivot pin 101 carried by a vertically disposed, reciprocator plate 102.

Plate 102 is mounted on one end of a rotatable horizontally disposed shaft 103 which is journaled by a pair of journal arms 104 which extend from platform 85. It is therefore seen that, upon rotation of the shaft 103, the shaft 95 will be reciprocated in a vertical path. Shaft 103 projects outwardly of the arms 104 and on the end, opposite plate 102, is provided a sprocket 105. Sprocket 105 is driven by a chain 106 from main drive shaft 200.

Returning again to the rails 86, 87, 88 and 91, these rails, as viewed from above such as in FIG. 10, are curvilinear or arcuate, with rail 89 being inwardly contiguous with rail 86, and rail 91 being inwardly contiguous with rail 87.

The upper edges of the vertically disposed rails 86 and 87 are essentially the same, having a plurality of forwardly inclined, flat successively arranged, steps 107 and 108, respectively.

The steps 107 are offset from each other and are connected by vertically disposed shoulders 109. In like manner, the steps 108 are separated by vertically disposed shoulders 110. At the entrance of the outer rails 86 and 87 are flat receiving surfaces 111 and 112. The rails 86 and 87 are spaced apart by a distance less than the length of the major diameter of the eggs 100. Therefore, as the eggs are discharged from the discharge end of the transfer conveyor 50 they are received on the surfaces 111 and 112 and the inertia of the egg will cause it to roll down the first pair of inclined steps 107, 108, and be stopped by the first shoulders 109 and 110.

The inner rails 89 and 91 are provided with inclined steps 113 and 114, respectively, which are separated by shoulders 115 and 116. The steps 113 and 114 are disposed parallel to the steps 107 and 108 and the shoulders 115 and 116 are disposed parallel to the shoulders 109 and 110. Furthermore the shoulders 115 and 116 are forwardly of the shoulders 109 and 110.

The amplitude of reciprocation of the inner rails 89 and 91 by the shaft 95 is such as to dispose the steps 113 and 114 alternately below and above their associated steps 111 and 112. Thus, after the eggs 100 have rolled to an arrested position against the shoulders 109 and 110, the upward movement of the inner rails 89 and 91 will cause the inner steps 113 and 114 to urge the eggs 100 over the shoulders 108 and 109 so that they then roll down the next incline steps 107 and 108. By this arrangement, each egg 100 is caused to traverse an arc of approximately 40 degrees defined by the arc of the transfer rack 60. At the same time, the eggs 100 are kept in a separated condition since the inner rails 89 and 91 are reciprocated in synchronization with the delivery of the eggs from the transfer conveyor 50 one egg being delivered for each reciprocation of the inner rails 89 and 91.

At the forward end of the outer rails 87 and 88 the forward edge is concave at numerals 117 and 118 so as to project over the innermost helical rod 120 of the helix conveyor 70.

HELIX CONVEYOR

The helix conveyor 70 includes a pair of spiral or helical rods 120 and 121 which are disposed in side-by-side relationship the axes of which are disposed in the same horizontal plane and are parallel to the path of travel of the transfer conveyor 50 but are offset sidewise thereof.

The ends of helical rod 120 are carried by a pair of stub shafts 122 and 123. In like manner, the ends of helical rod 121 are carried by stub shafts 124 and 125, seen in FIG. 1. The shafts 122 and 124 are journaled in a journal box 126 and are provided with sprockets 127 and 128 which are driven, respectively, by chains 129 and 130 from a drive sprocket 131 on drive shaft 200. The journal box 126, in turn, is carried by the platform 85.

The shafts 122 and 124 are rotated in the same direction and therefore the helical rods 120 and 121 are rotated in synchronization with each other and in the same direction. It is significant, however, that the convolutions of helical rod 120 are advanced with respect to the convolutions of helical rod 121 whereby the lowermost portions of rod 120 are advanced along the path of travel with respect to the lowermost portions of rod 121. By such an arrangement, the eggs 100 discharged from the transfer rack 60, are received on the rearwardly and downwardly inclined forward portions of the helical rods 120 and 121 and gently roll downwardly as the spirals advance and are ultimately received on the lowermost portions of the helical rods 120, 121, being disposed at an angle of 50 degrees with respect to the path of travel of the eggs 100. Upon rotation of the helical rods 120 and 121, the eggs 100 are urged forwardly while, at the same time, being rotated about their major axes.

To prevent the eggs 100 from jumping off of the rods 120 and 121 as they are discharged from the transfer rack 60, a retarder block 135, of resilient material, is suspended over the helical rods 120 and 121, in the path of travel of the eggs 100 from the transfer rack 60. An L-shaped bracket 136, which projects upwardly from the platform 85, suspends the block 135 in an appropriate position. Stops (not shown) limit the swing of the block 135. Thus, travel of the egg 100 is arrested by the block 135 as the egg is discharged onto the helical rods 120 and 121; however, when the eggs 100 are disposed on the lowermost portions of the helical rods 120 and 121, the eggs 100 freely pass beneath the block 135.

Figure 12:
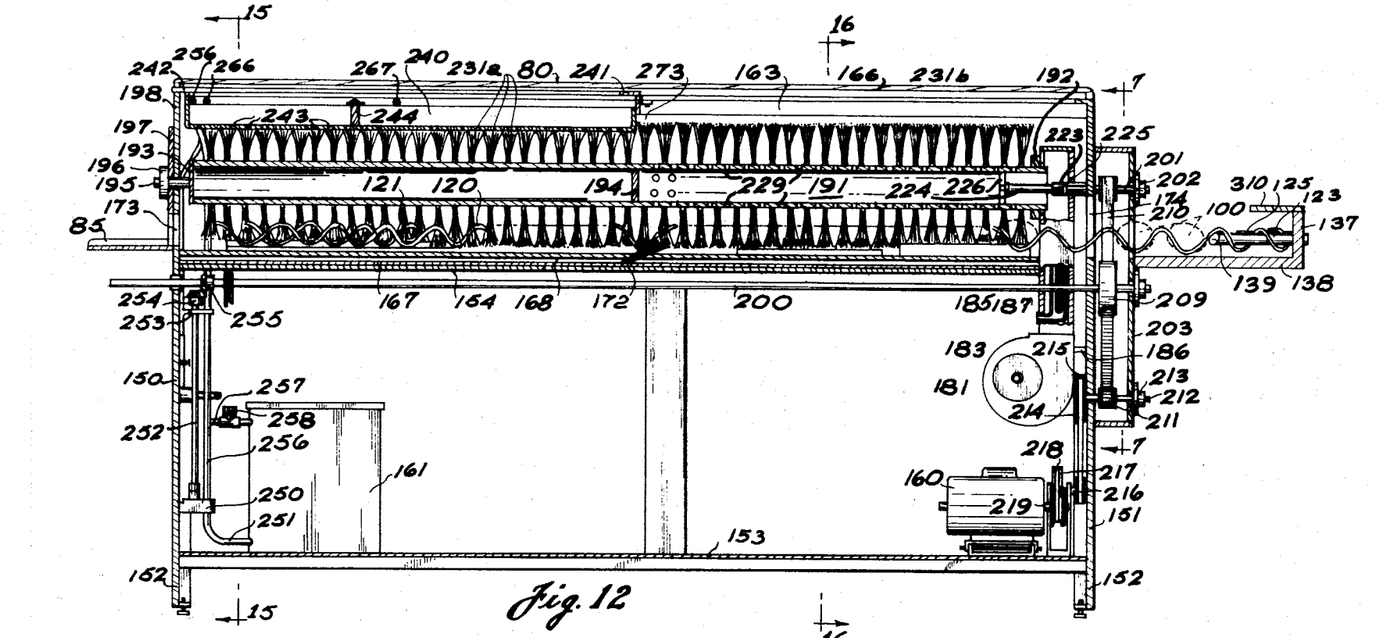
FIG. 12 is a vertical sectional view of the washer-dryer assembly of the machine shown in FIG. 1.

The shafts 123 and 125 are journaled for free rotation by a vertical plate 137 carried by a brace 138, best seen in FIG. 12. As seen in FIGS. 1 and 12, the inner ends of the shafts 123 and 125 are beveled, the shaft 125 being shorter than the shaft 123 so that the flat beveled ends 139 and 140 are momentarily in alignment in a vertical position when a convolution of each helical rod 120, 121, is at its lowermost position adjacent the ends 139 and 140. Thus, as each egg reaches the end of its travel on the rods 120, 121, it is urged sidewise off of the rods 120 and 121 by ends 139 and 140 and onto the inspection platform 90.

WASHER-DRYER ASSEMBLY

Figure 16:
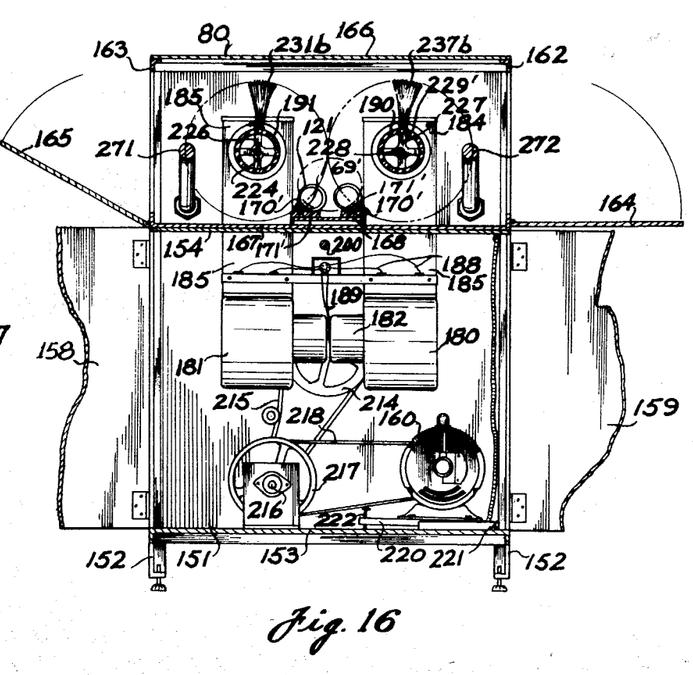
FIG. 16 is a vertical sectional view taken substantially along line 16—16 in FIG. 12; and, FIG. 17 is a cross sectional view of a detail showing the dam in the trough of the washer-dryer assembly.

The washer-dryer assembly 80 is best seen in FIGS. 12, 15 and 16. The function of the washer-dryer assembly is to wash the egg 100 with a hot water and detergent mixture, then, if desired, rinse the egg 100 and thereafter dry the egg 100. In the first approximately one-half of the washer-dryer, the eggs 100 are subjected to scrubbing action and detergent and water. If desired, this washing zone may be itself sub-divided into a washing zone and a rinsing zone. The last approximately one-half of the washer-dryer is, however, the drying zone.

The washer-dryer assembly 80 includes a pair of vertically disposed opposed parallel end plates 150 and 151 which are supported by legs 152. A bottom shelf 153 extends between the bottom edges of the end plates 150 and 151. Above and approximately parallel to the bottom shelf 153 is a flat drain supporting plate 154, the respective end of which is secured to intermediate portions of the end plates 150 and 151. Appropriate doors 156 and 157 are hingedly secured to the side edges of end plate 150 while other suitable doors 158 and 159 are hingedly secured to the end plate 151. These doors, when closed, define, together with the bottom shelf 153 and plate 154, an accessible compartment which houses the main motor 160 and a detergent tank 161, as well as other equipment, to be described hereinafter.

Extending between the upper corners of the end plates 150 and 151 are a pair of spaced, parallel, longitudinally disposed, angle bars 162 and 163. A pair of outwardly and downwardly opening access doors 164 and 165 are respectively hingedly secured to side edges of plate 154 so as to be swung upwardly and inwardly to close the upper side portions of the washer-dryer assembly 80. Top cover 166 covers the top of the washer-dyer assembly 80.

Shafts 199 and 201 are journaled by bearings, such as bearing 202 mounted on housing 203 which, in turn, is mounted on the outside surface of end plate 151. The shafts 199 and 201 project through the plate 151 and terminate respectively within the ducts 184 and 185, above and on opposite sides of the helical rods 120 and 121.

Shaft 199, within the housing 203, is provided with a gear 204 which meshes with a gear 205 on a power transfer shaft 206, supported between the end plate 151 and the housing 203.

Outwardly of the gear 205, shaft 206 is provided with a pulley 208. The main drive shaft 200 is provided with a pulley 209 and a continuous belt 210 passes under pulley 209 and over pulleys 207 and 208, and thence, downwardly and around a drive pulley 211 on shaft 212. The shaft 212 is journaled by the end plate 151 and a bearing 213 carried by the housing 203. On the inside of the end plate 151, shaft 212 is provided with a pulley 214 which is driven by a continuous belt 215 from a power transfer shaft 216.

A pulley 217 on shaft 216 is driven by a belt 218 which passes around a variable diameter pulley 219 on motor 160. The motor 160 is mounted on a platform 220 which is hingedly secured to shelf 153 by a pivot pin 221. The platform 220 is tilted upwardly or downwardly about pivot pin 221 by means of an adjustment screw 222. Thus, by raising or lowering the platform 220, by means of screw 222, the effective diameter of pulley 219 may be varied to vary the speed of drive of shaft 216, and, hence, the speed at which the entire machine will be driven.

Returning again to the brush tubes 190 and 191, each of the shafts 199 and 201 is provided, within their respective ducts 184 and 185, with a quick release coupling, such as coupling 223, seen in FIG. 12. The coupling 223 receives a stub shaft 224 which is provided with a shear pin 225 received transversely of the coupling 223. Shaft 224 is secured to a spider 226 mounted within the end portion of brush tube 191. In like manner, the tube 190 is provided with a spider 227 which carries a stub shaft 228 which is removably coupled with shaft 199 within the duct 184.

Both brush tubes 190 and 191 project longitudinally parallel to each other throughout approximately the entire length of the washer-dryer assembly 80 and are transversely spaced from each other, being above and respectively outwardly of the helical rods 120 and 121. Upon energization of the motor 160, the brush tubes 190 and 191 will be rotated in opposite directions, the brush tube 190 being rotated in a clockwise direction, as viewed in FIG. 15, and the brush 191 being rotated in a counterclockwise direction, as viewed in that figure.

Between the block 194 and the end of the tube 191 which terminates within the duct 185, the tube 191 is perforated with a plurality of holes 229. In like manner, the brush tube 190 is provided with holes 229. Therefore, when blowers 180 and 181 are actuated, and the heating elements, such as element 187, are energized, heated air will be driven up through ducts 184 and 185 and through the hollow interior of brush tubes 190 and 191, so as to be discharged, radially, through the holes 229 and 229'.

Figure 13:
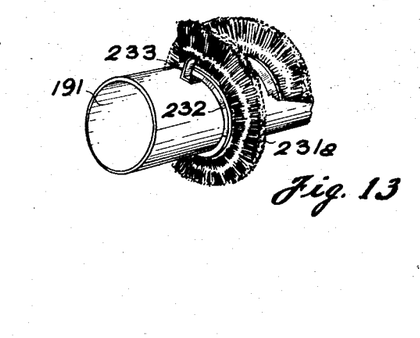
FIG. 13 is an enlarged fragmentary perspective view of a portion of one of the brush mechanisms utilized in the washer-dryer assembly.

A brush member, best seen in FIG. 13, is helically wound around the brush tube 191 from substantially one end to the other, the brush member terminating inwardly of end plate 193 and inwardly of bushing 192. The brush contains radially extending bristles 231a and 231b which are retained by a helical U-shaped metal base 232. Bristles 231a which are relatively stiff while bristles 231b are relatively soft and constitute the other one-half of the brush member. Bristles 231a are for washing or washing and rinsing while bristles 231b are for drying the eggs 100.

Figure 14:
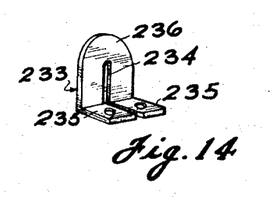
FIG. 14 is an enlarged perspective view of a detail, showing the clip used for retaining the brush on the brush tube of the brush mechanism.

At intervals along the base 232, U-shaped clips 233 secure the brush 230 in place. Each clip 233, as seen in FIG. 14, is formed from an initially flat piece of metal having a central slot 234 which is bent at a right angle to provide a pair of bases 235 and a U-shaped body 236, the ends of arms of the U-shaped body 236 being integrally connected to the ends of the bases 235. The clips 233 are braded or riveted to the periphery of brush tube 191.

The brush tubes 190 and 191 are identical and the brush members contained thereon are also identical. Therefore, no detailed description of the brush tube 190 and its brush member is included, except to state that it has relatively stiff bristles 237a and relatively soft bristles 237b.

The bristles 231a are of such a length as to engage and scrub in a downwardly direction from both sides each egg 100 as it is carried on the helical rods 120 and 121.

For supplying detergent and hot water and also for supplying rinse water, a V-shaped elongated trough 240 is suspended above the path of travel of the eggs 100, as best seen in FIG. 12. The length of trough 240 is approximately equal to the length of tube 191 from the end plate 193 to the intermediate stop 194 and defines the length of the washing zone or the washing and rinsing zones, as the case may be. For supporting the trough in the position illustrated in FIG. 12, a pair of cross bars 241 and 242 are provided at the ends of the trough 240 and extend transversely across the washer-dryer assembly 20, so as to be supported by the longitudinally extending angle bars 162 and 163. The trough 240 is provided with a plurality of holes 243 through which water and detergent (and rinse water, as the case may be) are discharged by gravity onto and between the brushes 230 and 237 and thence onto the eggs 100 as they are carried by the helical rods 120 and 121.

Figure 17:
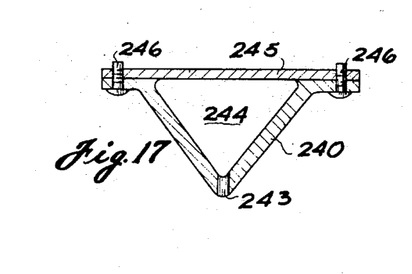

When the trough 240 is to be utilized for discharging detergent and water in one portion thereof and rinse water in the other portion thereof, triangular shaped petition dam 244, formed of resilient material such as rubber, and shaped to conform to the inclined sides of the trough 240, is urged down into the trough 240, so as to separate the trough 240 into two compartments. The petition dam 244 is retained in place by a cross bar 245, seen best in FIG. 17, which extends over the upper edge of dam 244 and through which a pair of spaced bolts 246 pass in an upwardly direction. The bolts 246 are spaced apart appropriately so as to engage opposite edges of the trough 240. Of course, by removing one of the bolts 246, the cross bar 245 and the dam 244 may be removed from the trough 240. When the dam 244 is removed, the trough 240 is to be utilized for discharging a mixture of detergent and water through the holes 243, throughout the length of the trough 240.

Carried by the drain supporting plate 154 is a drain tray 167, the drain tray being approximately the same size as the plate 154 and extending substantially the entire length of the washer-dryer assembly 80. Within the central portion of the tray 167 is an inverted channel member 168.

At the entrance end of the washer-dryer assembly 80, i.e., adjacent the end plate 150, and carried by the channel member 168 are a pair of opposed, helical rod support members, each member including a rectangular spacer 169 mounted in spaced, parallel relationship to each other, a side retainer 170 mounted on top of the spacer 169, and a bottom rest 171 mounted inwardly of the spacer 169. The purpose of these members is to support the helical rods 120 and 121 at the entrance end portion of the washer-dryer assembly 80. The side retainers 170 are essentially triangular in cross section while the spacers 169 and the bottom rest 171 are rectangular in cross section.

At the exit end of the washer-dryer assembly 80, i.e., adjacent the end plate 151, approximately the same support member arrangement is provided, including a pair of spacers 169', a pair of side retainers 170' on spacers 169', and a pair of bottom rests 171' inwardly of spacers 169'. The inner ends of the support members, described above, terminate in spaced relationship to each other and inwardly thereof, a plurality of holes are provided in the inverted channel member 168 and through which a plurality of incline brushes, such as brush 172, seen in FIG. 12, project so as to engage the helical rods 120 and 121 and sweep trash from rods 120, 121.

In end plate 150 is an appropriate opening which provides an entrance 173, through which the helical rods 120 and 121 project. In like mnner, the end plate 151 is provided with an opening, forming an exit 174, through which the helical rods 120 and 121 project. The bottom rests 171, 171' support, respectively, the bottoms of the helical rods 120 and 121 while the side retainers 170, 170', support the lower outer sides of the helical rods 120 and 121.

As seen best in FIGS. 12 and 16, a pair of centrifugal air blowers 181 and 182 are mounted on the inside surface of the end plate 151, below the drain supporting plate 154. These air blowers 181, 182, are driven by a motor 182 disposed therebetween. The blowers 181, 182, respectively, discharge into upright air ducts 184 and 185 which project upwardly through the plate 154 and the pan 167 on opposite sides of the helical rods 120, 121, and terminate inwardly of the top 166. The blowers 180, 181, and the air ducts 184, 185, are supported adjacent but in spaced relationship to the end plate 151 by a plurality of braces 186.

Within the air ducts 184 and 185, respectively, are electrical heating elements, such as element 187, seen in FIG. 12. Suitable electrical cables 188, seen in FIG. 16, connetced to a source of electrical power, supplies electricity for the heating elements, such as element 187, Furthermore, suitable electrical cables 189 supply electrical current to the motor 182.

The air ducts 184 and 185 are provided with circular openings along their innermost surfaces, above the tray 167. The ends of hollow, cylindrical brush tubes 190 and 191 are respectively received in these openings, the tubes 190, 191, being received in nylon bushings, such as bushing 192 mounted on the inner surfaces of the ducts 184 and 185. Each tube, such as tube 191, is a hollow cylindrical member, closed at one end by an end plate, such as end plate 193 and closed at approximately its mid-portion by a median block 194. A shaft 195 projects outwardly from the end plate 193 and is journaled by a bearing 196 carried on a mounting plate 197.

The end plate 150 is provided with a pair of upwardly opening shaft receiving slots 198 so as to receive therein the shafts, such as shaft 195. The mounting plates, such as plate 197, are bolted to the outer surface of end plate 150. When it is desired to remove, for example, brush tube 191, plate 197 is unbolted and that end of tube 191 lifted out.

On its outer surface, end plate 151 is provided with a power transfer assembly housing 203 within which a power transfer assembly is provided. This power transfer assembly, as seen in FIG. 7, includes a pair of brush driving shafts 199 and 201. The shafts 199 and 201 project through the end plate 151 for the purpose of rotating the brush tube 190 and 191, respectively.

For supplying a washing solution such as a liquid detergent and water to trough 240 from tank 161, a pumping assembly has been provided which is best seen in FIGS. 12 and 15. This pumping assembly includes a positive displacement pump 250, the intake end of which is connected via tube 251 to the bottom portion of tank 161. Pump 250 is mounted on end plate 150 and a vertically disposed drive shaft 252 supplies power to the pump 250 from shaft 200, the shaft 252 being rotatably supported by a bracket 253 and provided at its upper end with a beveled gear 255 on shaft 200.

The pump 250 discharges to an upstanding pipe or tube 256 which communicates, via tube 257 and a needle valve 258, to the top of tank 161 for recirculation. By manipulation of the needle valve 258, the amount of liquid detergent from tank 161 which is returned to tank 161 is determined. The tube or pipe 256, however, passes upwardly through the plate 154 and tray 167 and discharges into trough 240, adjacent the end plate 150. In operation, the valve 258 is almost closed, thereby supplying sufficient liquid detergent through pipe 256 to the trough 240. It will be understood that the liquid detergent in tank 161 is concentrated detergent and that the mixing of water with the detergent takes place in the trough 240. To accomplish this, hot water from an external source is supplied through tube 260 to a solenoid valve 261 mounted on the end plate 150. A suitable solenoid 262 actuates the valve 261. Valve 261 is connected to a pipe 263 which leads to a manual cut-off valve 264 and thence through pipe 265 to a pair of water delivery pipes 266 and 267. These water delivery pipes 266 and 267 pass upwardly through the plate 154 and trough 167 and tube 267 discharges into the trough 240 adjacent the detergent delivery pipe 256. The tube 266 discharges beyond the position of the dam 244, i.e., between the dam 244 and the end of the trough carried by the cross bar 241.

It is now seen that, with the dam 244 in place, only water is delivered to the trough 240 between dam 244 and the end of trough 240 which is adjacent the cross bar 241; while both detergent and water are delivered through the tubes 256 and 266 into the trough between dam 244 and the end of the trough adjacent cross bar 242. Therefore, as the eggs 100, traveling on the helical rods 120 and 121, are carried beneath the first portion of the trough 240, a mixture of water and detergent is played on the eggs 100 while the brushes 231a and 237a scrub the eggs 100. The movement of the helical rods 120, 121, maintain the axis of the eggs 100 at approximately 50 degrees from the path of travel and tend to rotate the eggs 100 about their major axes as they are moved in their path of travel. The bristles 231a and 237a therefore, strike all portions of each egg 100 with both bristles 231a and 237a striking the middle periphery of the egg as it turns, so as to scrub it, thoroughly.

In the event that the dam 244 is in place, only fresh water is played on the eggs 100 after they pass beneath dam 244. Thus, is provided both a washing zone and a rinsing zone in which the eggs 100 are first washed with detergent and water and then subjected to rinse water. The detergent and water, after being applied to the eggs 100, are received in the trough 167 and are discharged through a drain fitting 270, seen in FIG. 15. There is no recirculation of the water and the detergent after passing out of the drain 270.

After the washing, or the washing and rinsing operation, the eggs are progressively moved by the rods 120, 121, beneath the drying bristles 231b and 237b, which are located beyond the trough 240. It will be remembered that the brush tubes 190 and 191 are provided with a supply of heated air which is discharged radially therefrom. This air passes through the drying bristles 231b and 237b where the moisture on the surface of the eggs 100 is brushed off by the bristles 231b and 237b and the eggs 100 are dried by the hot air playing thereon.

For keeping the bristles 231b and 237b in a dry condition, a pair of bars 271 and 272 are disposed adjacent the outer peripheries, respectively, of bristles 231b and 237b. The ends of bars 271 and 272 are secured to end plate 152 while the inner ends of bars 271 and 272 are carried by straps, such as strap 273, seen in FIG. 12, the straps extending downwardly from the angle bars 162 and 163 and being secured to the pan 167. The tip portions of bristles 231b and 237b engage the bars 271 and 272 so that the excess moisture is flung off.

It is, therefore, seen that the eggs 100, after being washed, are subjected to a drying operation in the drying zone and are, thereafter, fed out of the exit opening 174.

COLLECTION TABLE

The collection table 90 is a rectangular tray which is supported by the housing 203 immediately below the discharge end of the helical rods 120 and 121. The eggs 100, which are discharged through the opening 174, pass along the helical rods 120 and 121 until they engage the beveled ends 139 and 140 and are discharged onto the collection table 90. If the eggs 100 happen to override the beveled ends 139 and 140, they strike a beveled edge of a safety plate 310 carried by vertical plate 137.

From the foregoing description, it is seen that various objects of the present invention have been met by the preferred embodiment hereinbefore described. The machine described above is quite inexpensive to manufacture and yet operates at a relatively high speed of approximately 20 cases, 600 dozen eggs per hours. If it is desired to vary the speed, it requires only the manipulation of screw 222.

Throughout the operation, the eggs are gently handled by the various components. First, the eggs are carried quite gently by the spool bars 23 and then, aided by the paddles 53, are gently deposited on spools 81. Thereafter, the spools 81, gently transfer the eggs onto the transfer rack, which, in turn, gently transfers the eggs onto the helical rods 120 and 121. Upon reaching the ends of the rods 120, 121, the eggs are gently urged onto the inspection platform 90.

The brushes are quite gentle in operation and yet thorough in scrubbing the eggs. After being scrubbed by the bristles 231a and 237a, the brushes 231b and 237b wipe the excess water therefrom. At the same time, the hot air plays on the eggs so that they are thoroughly dried.

The brushes and brush tubes 190, 191, are removable from the machine by unbolting the plates, such as plate 197, and by simply lifting the brush tubes 190 and 191 upwardly and outwardly. Also, the trough 240 is readily and easily removed by simply lifting it upwardly after removing top 166. Thus, the interior of the washer-dryer assembly 80 is readily accessible and can be cleaned periodically, if desired.

Since the eggs 100 can be placed automatically on the cross loader 10 by a vacuum loader (not shown), only one operator is required to inspect the eggs on the machine. The candling operation is automatic, requiring only the attendance of the one operator who views the eggs as they are automatically spun and light is directed up through them.

Since the eggs are disposed at an acute angle to the path of travel during the washing and drying operation, the eggs are quite thoroughly scrubbed by the brushes. Thus, quite rapid processing of the eggs can be accomplished.

The rods 120, 121 provide a quite inexpensive conveying system which is effective in gently moving the eggs along a prescribed path.

It will be obvious to those skilled in the art that many variations may be made in the embodiment here chosen for the purpose of illustrating the present invention without departing from the scope thereof as defined by the appended claims.

We claim:

1. A washer-dryer assembly for washing and drying elliptical objects comprising a conveyor disposed for conveying successive ellipsoidal objects along a prescribed path, said conveyor including a pair of helical rods disposed with their axes parallel to and spaced from each other by a distance less than the length of the major axis of the ellipsoidal objects, the convolutions of one helical rod being advanced with respect to the convolutions of the other for supporting said objects in the lowermost portions of said rods with their axes at acute angles to said path, means for rotating said rods in synchronization with each other, and washing means disposed adjacent said rods for washing successive of said objects as they are moved by said rods past said washing means, and drying means anteriorally of said washing means for drying said objects successively as they are moved by said rods past said drying means.

2. The structure defined in claim 1 wherein said washing means and said drying means include a pair of brush tubes disposed parallel to and on opposite sides and above said predetermined path, brushes extending from said brush tubes for engaging said objects, means for rotating said brush tubes, and means for discharging air from said brush tubes.

3. The structure claimed in claim 1 wherein said drying means includes a rotatable brush disposed adjacent the path of travel of said objects, for engaging the surface of said objects, and means for discharging air through said rotatable brush and onto said objects.

4. In an egg washer dryer assembly, a conveyor for moving successive eggs along a predetermined path, a brush tube disposed adjacent said predetermined path, brushes projecting from said brush tube for engaging said eggs in said predetermined path, means for supplying a washing solution to a first portion of said brushes on a first portion of said brush tube, means for discharging air from a second portion of said brush tube through a second portion of said brushes, and means for rotating said brush tube.

5. The structure claimed in claim 4 wherein said brush tube is hollow in said second portion of said brush tube and is provided with a plurality of radially spaced holes, an air duct enclosing the hollow end portion of the second portion of said brush tube, means for discharging air through said air duct into said hollow portion of said brush tube, and means for heating said air.

6. An egg inspection washing and drying machine comprising a cross loader, a transfer conveyor disposed at one end of said cross loader, a transfer rack at the end of said transfer conveyor, a helix conveyor disposed adjacent the end of said transfer rack, and a washer-dryer assembly through which said helix conveyor passes, said cross loader being constructed and arranged to convey a plurality of transverse rows of eggs successively thereacross and discharge said eggs at the discharge end thereof in successive rows, means for receiving and successively lowering said eggs onto said transfer conveyor, said transfer conveyor being disposed approximately perpendicular to the said cross loader and being adapted to receive said transverse rows of the eggs in single file fashion, said transfer rack being adapted to move said eggs along a prescribed path and to deposit said eggs angularly onto said helix conveyor, said helix conveyor being adapted to move said eggs along a predetermined path of travel and to dispose said eggs with their major axes at an acute angle to said path of travel and to rotate said eggs as the same are being conveyed, washing means within said washer-dryer assembly for washing said eggs as they are passed through a washing zone in said washer-dryer assembly, and drying means in said washer-dryer assembly for drying the eggs after the same have been washed.

References Cited

UNITED STATES PATENTS

| | | | |
|---|---|---|---|
| 1,694,675 | 12/1928 | White | 15—3.2 |
| 2,618,216 | 11/1952 | Mulvany | 15—3.13 |
| 2,627,140 | 2/1953 | Marzolf | 15—3.17 X |

FOREIGN PATENTS 775,039  5/1957  Great Britain.

EDWARD L. ROBERTS, Primary Examiner